INVENTORS
JAMES L. JOHNSON
FRANK C. SCHORA, JR.
PAUL B. TARMAN

INVENTORS.
JAMES L. JOHNSON
FRANK C. SCHORA, JR.
PAUL B. TARMAN

United States Patent Office 3,700,421
Patented Oct. 24, 1972

3,700,421
APPARATUS FOR CONDUCTING A CONTINUOUS STEAM-IRON PROCESS
James L. Johnson, Oak Park, Frank C. Schora, Jr., Palatine, and Paul B. Tarman, Elmhurst, Ill., assignors to Consolidation Coal Company, Pittsburgh, Pa.
Original application Feb. 11, 1969, Ser. No. 798,334. Divided and this application Feb. 17, 1971, Ser. No. 116,051
The portion of the term of the patent subsequent to Nov. 9, 1988, has been disclaimed
Int. Cl. C10j 3/20
U.S. Cl. 48—73                                    2 Claims

ABSTRACT OF THE DISCLOSURE

Apparatus is provided for conducting a continuous steam-iron process wherein finely divided iron oxides are reduced in a reduction vessel and the reduced iron oxides are reacted with steam in an oxidation vessel to make hydrogen. The reduction of the iron oxides is effected by means of a continuously recirculating stream of hot, finely divided carbonaceous solids which are mixed with the iron oxides in a downwardly moving bed under reducing conditions, and heat is supplied by the carbonaceous solids which are heated by partial combustion outside the reduction vessel. The mixture of reduced iron oxides and carbonaceous solids from the reduction vessel is separated in a separation vessel into a stream of reduced iron oxides and a stream of carbonaceous solids. The stream of reduced iron oxides is conducted to the oxidation vessel where the reduced iron oxides react with steam to reoxidize the reduced iron oxides. The latter are returned to the reduction vessel. The carbonaceous solids separated in the separation vessel are returned to the reduction vessel after passage through a partial combustion zone.

REFERENCE TO RELATED APPLICATION

This application is a division of copending application, Ser. No. 798,334, filed Feb. 11, 1969, now Pat. No. 3,619,142, issued Nov. 9, 1971 and assigned to the assignee of the present invention.

BACKGROUND OF THE INVENTION

Field of the invention

This invention relates to an apparatus for conducting an improved steam-iron process for making hydrogen or fuel gas.

The steam-iron process is a process for making hydrogen by the reaction of steam with either elemental iron or a lower iron oxide, for example, FeO. The reaction produces higher oxides of iron, for example, $Fe_3O_4$, which may be reduced to repeat the cycle.

Despite the apparent simplicity of the steam-iron process and despite the fact that it has been known and worked on for over one hundred years, to the best of our knowledge no technically and economically feasible embodiment of a continuous steam-iron process has been developed which is now practiced commercially. Perhaps the principal reason for the failure of the steam-iron process to achieve commercial success is the difficulty involved in making it a continuous process. To do so requires subjecting a continuously flowing recirculatory stream of iron oxides to two different reactions, namely oxidation and reduction, under optimum conditions for each reaction, including optimum input and distribution of the heat required in the process.

Description of the prior art

Prior continuous steam-iron processes have favored the use of gaseous reductants for reducing the iron oxides (see, by way of illustration, U.S. Pat. No. 2,198,560). However, the production of a suitable gaseous reductant is expensive, and renders the overall process uneconomical. Furthermore, because of the limitations imposed by the thermodynamic equilibrium during the reduction of $Fe_3O_4$ and FeO to FeO and Fe with reducing gases containing hydrogen and carbon monoxide, the off-gas from once-through reduction contains considerable unreacted hydrogen and carbon monoxide. Thus, such a process tends to be wasteful of reducing gas.

In U.S. Pat. No. 3,503,724 of Homer E. Benson, issued Mar. 31, 1970, the reducing gas is made in situ by reacting air and carbonaceous solids in the presence of the iron oxides. Such a process has many advantages but requires careful control to minimize reconversion of elemental iron to higher oxides by contact with air.

Continuous steam-iron processes have been proposed which utilize either a solids in gas dispersion or the fluidized solids technique in the oxidation zone and the reduction zone (see, by way of illustration, U.S. Pats. Nos. 2,602,809 and 3,017,250). Reducing systems employing a dispersion of powdered iron oxide in a suspending gas call for large reactors and costly gas-solids separators. All attempts to operate with the iron oxide in a fluidized condition have failed to become sufficiently attractive for commercial adoption because a fluidized mass is of uniform composition throughout whereas a composition gradient is generally desired.

SUMMARY OF THE INVENTION

In accordance with the present invention we have provided apparatus for conducting an improved continuous steam-iron process which uses not only a recirculatory stream of particulate iron oxides, but also uses a recirculatory stream of particulate carbonaceous solids to effect reduction of the iron oxides and to supply process heat requirements. In the practice of the process of this invention, reduced iron oxides comprising principally FeO and Fe are oxidized by steam in an oxidation zone, and iron oxides comprising principally $Fe_3O_4$ and FeO are reduced in a reduction zone. By "principally" we mean that at least fifty percent by weight of any mixture of oxidizable or reducible iron compounds, as the case may be, consists of the indicated compounds, and the actual percentage approaches 100 percent under equilibrium conditions. The relative amounts of FeO and Fe in the oxidizable mixture, and the relative amounts of $Fe_3O_4$ and FeO in the reducible mixture are functions largely of the temperature, pressure, and residence time maintained in the respective reaction zones. The oxidation of FeO and Fe (sometimes simply referred to herein as reduced iron oxides) is accomplished by passing steam in reactive relationship with the reduced iron oxides in an oxidation zone. The reduction of $Fe_3O_4$ and FeO is accomplished by subjecting them to direct contact with the recirculatory stream of hot carbonaceous solids in a downwardly moving bed in the reduction zone. No oxygen-(molecular) containing gases are introduced into the moving bed in the reduction zone. The reduction conditions are selected to insure that only partial carbon depletion is effected during the passage of the carbonaceous solids through the reduction zone, while however, the desired reduction of the iron oxides to Fe and FeO is effected. Heat is supplied to meet the requirements of the process by partial combustion of the carbonaceous solids in a combustion zone located outside the reduction zone. The amount of partial burning is controlled to raise the temperature of the carbonaceous solids sufficiently high to supply adiabatically the heat required.

A separation zone is interposed between the reduction zone and the oxidation zone to effect separation of the carbonaceous solids from the reduced iron oxides leaving the reduction zone. Separation is effected by passing a gas through the mixture of carbonaceous solids and reduced iron oxides at a velocity which permits ready separation by virtue of the difference in densities of the iron compounds and carbonaceous solids. A fluidized separation zone is especially preferred wherein the fluidized bed consists essentially of the lighter carbonaceous solids from which the heavier iron compounds may be with drawn and sent to the oxidation zone. The oxidation zone in the preferred embodiment comprises a fluidized bed of fresh carbonaceous solids into which the reduced iron oxides are fed. Hydrogen is produced by the relatively fast reaction of steam and reduced iron oxides, and in turn reacts with the carbonaceous solids to form methane. The separated carbonaceous solids from the separation zone are recirculated through the combustion zone back to the reduction zone.

The process operates continuously and efficiently to yield hydrogen or a methane-rich gas. The improvement in economics of the process as compared with prior steam-iron processes is due to the efficient use of low cost, finely divided carbonaceous solids for (1) the reduction of iron oxides, (2) the supply of process heat, and (3) in the preferred embodiment, the production of methane in a relatively simple two-vessel system. The gain in efficiency in the reduction zone arises from the thermal gradient established in the downwardly moving bed and from the lack of back-mixing of reduced iron. Thus, maximum reduction rates result from the countercurrent flow relationship of the upwardly flowing reducing gases (generated in situ) and the downwardly flowing fresh iron oxides. The absence of molecular oxygen-containing gases assures no loss of desired reduction as a result of competing reactions. The flow of gases and solids in the oxidizer is most efficiently conducted in a fluidized bed for the particular reactions involved, to thereby minimize temperature gradients and to provide for an efficient balance between exothermic and endothermic reactions. Thus, in summary, the improved process provides for the maintenance of the optimum conditions for the reduction of $Fe_3O_4$ to FeO to Fe, and for the oxidation of the reduced iron oxides with steam.

BRIEF DESCRIPTION OF THE DRAWINGS

For a better understanding of our invention, its objects and advantages, reference should be had to the following description and accompanying drawings in which.

DESCRIPTION OF THE PREFERRED EMBODIMENT

Figure 1:
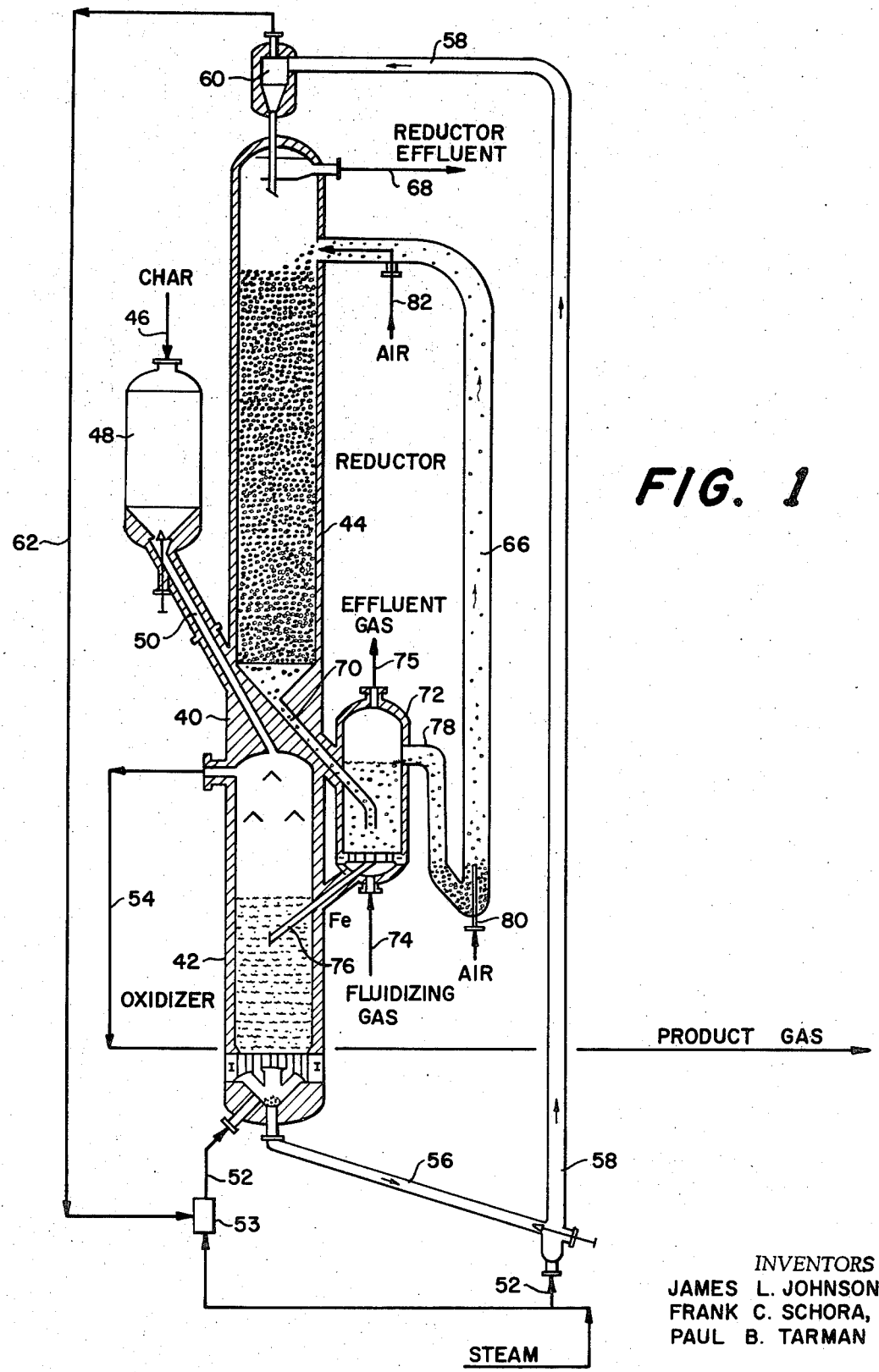
FIG. 1 is a diagrammatic drawing of the preferred embodiment of our invention.

The preferred embodiment shown diagrammatically in FIG. 1 is adapted to produce a methane-containing gas that may be converted by conventional means to a high B.t.u. gas. Fresh hydrocarbonaceous solids containing both fixed carbon and volatile carbon are continuously fed to the oxidation zone, labeled Oxidizer in the drawing and also designated by the numeral 42. The oxidation zone is contained in the lower part of a vessel 40, the upper part of which confines the reduction zone 44, sometimes called Reductor. The fresh, hydrocarbonaceous solids fed to the Oxidizer are high in total carbon content, in the range of fifty to ninety percent by weight. Preferably we use either char, the noncaking product resulting from pyrolysis of coal or lignite at low temperature, or a raw coal which has been rendered noncaking, if necessary, by preoxidation. The char, or raw coal (and hereafter reference is made only to char for convenience), is introduced by a pipe 46 into a continuous hopper 48 from which valve-regulated amounts of char are fed by a pipe 50 into the open space above the oxidation zone.

The char is maintained in a dense fluidized phase which serves as the oxidation zone. Elemental Fe and FeO substantially free of carbonaceous solids are introduced directly into the interior of the fluidized bed from a source and in a manner to be later described. The elemental Fe and FeO being of greater density than the fluidized char, descend in the bed in countercurrent flow relationship to steam which is introduced by a steam pipe 52 after being compressed by a jet compressor 53. Under the temperature and pressure conditions maintained in the oxidation zone, the steam reacts preferentially and rapidly with the elemental Fe and FeO to form hydrogen. At least some of the latter reacts with the char in the fluidized bed to form methane. The methane is discharged together with unused steam through an effluent gas pipe 54 for suitable treatment to recover a high B.t.u. gas.

The conditions maintained in the oxidation zone of the preferred embodiment are as follows: temperature, 1400 to 1800° F.; pressure, 100 to 1500 p.s.i.; and residence time of char, 1 to 200 minutes, with the higher pressures and longer residence times being preferred for methane production.

The mixture of iron oxides, mostly $Fe_3O_4$ and FeO, along with carbon-depleted char is withdrawn from the oxidation zone through a pipe 56. This mixture is lifted to the reduction zone through a lift pipe 58 by means of steam from the steam feed pipe 52. In recycling to the reduction zone, the solids pass through a cyclone separator 60 which separates the steam from the solids. The steam is returned through a conduit 62 to the oxidation zone after being compressed to the desired pressure, together with the rest of the inlet steam in the compressor 53. The solids drop out of the cyclone 60 into the space above the moving bed and thence onto the moving bed in the reduction zone.

The reduction zone consists essentially of a downwardly moving bed of two substantially concurrently flowing streams of solids. The recycled iron oxides are mixed with the hot stream of carbonaceous solids entering the vessel from a lift pipe 66 whose function will be more fully described below. The gas produced in the reduction zone is discharged through a pipe 68. The conditions maintained in the reduction zone of the preferred embodiment are as follows: temperature, 1500 to 2100° F.; pressure, 100 to 1500 p.s.i.; residence time, 1 to 30 minutes; carbon depletion per pass, 1 to 10 percent of the carbon in the carbonaceous solids; and weight ratio to char to iron oxides, 0.5 to 5 lb./lb.

The mixture of reduced iron oxides, principally Fe and FeO, along with partially carbon-depleted carbonaceous solids drops by gravity through an outlet conduit 70 to a separator 72. The latter is adapted to confine the mixture of solids in a fluidized state, the fluidizing gas being introduced by a pipe 74. The fluidizing gas may be essentially inert, or it may contain some steam. If it does contain steam, then some hydrogen may be generated, in which case the effluent gas from the separator may be conducted to the Oxidizer. Otherwise, the effluent gas may be discharged conveniently through conduit 75. Because of the different densities of the carbonaceous solids and the iron compounds, fluidization conditions can be selected to permit the iron compounds to settle out of the bed to be discharged through a conduit 76 into the oxidation zone 42. The fluidized char overflows into a pipe 78 which leads to the previously mentioned lift pipe 66. Air is introduced into the foot of the lift pipe through a pipe 80 not only to lift the solids back to the Reductor, but also to burn part of the carbonaceous solids under controlled conditions to raise the temperature of the solids sufficiently high to provide the heat required in the reduction zone. Additional air may be introduced into the space above the reduction zone through a pipe 82 to effect combustion of the carbon monoxide generated in the reduction zone, as well as some of the carbonaceous solids from the lift pipe 66.

The following example illustrates the operation of the preferred embodiment.

Figure 2:
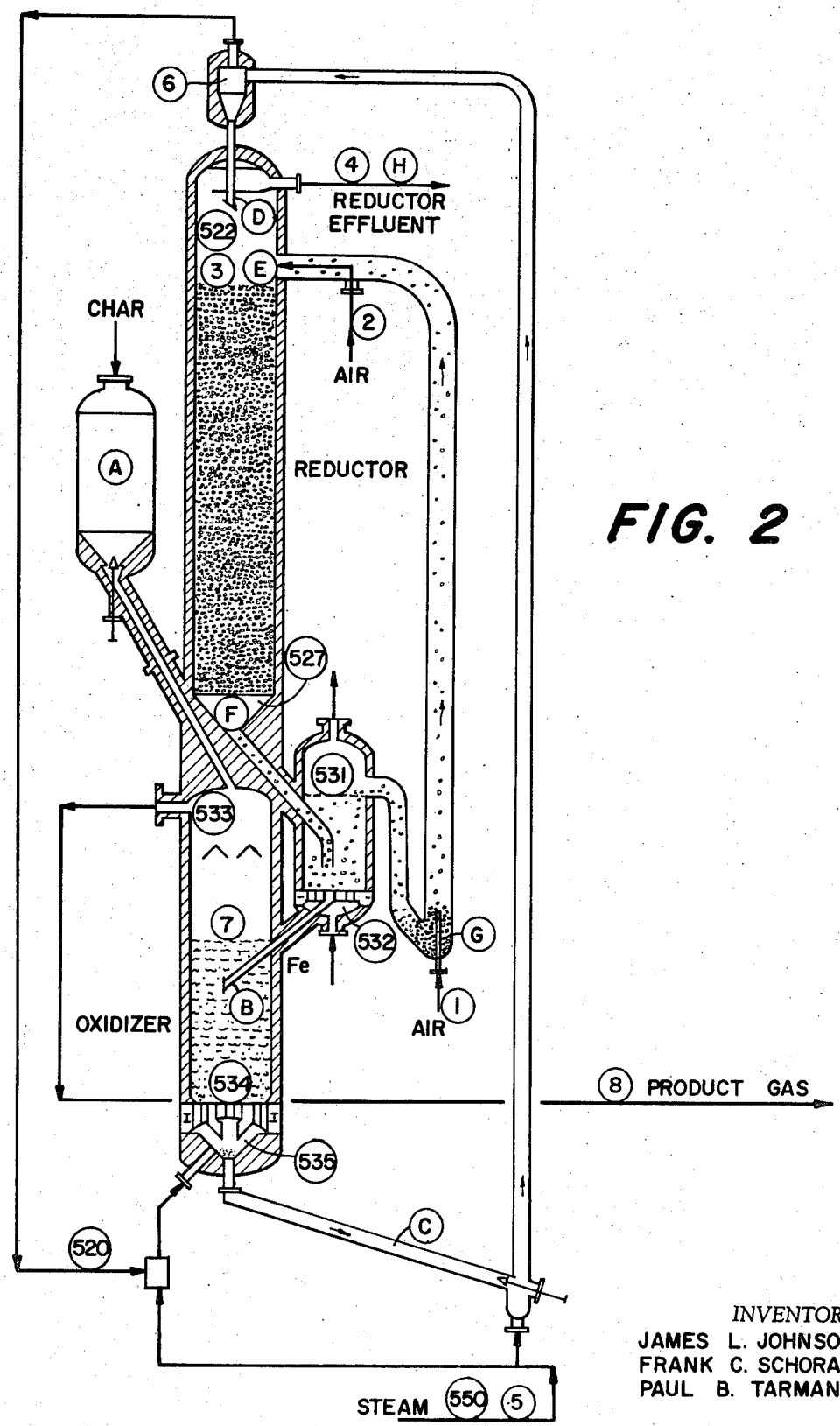
FIG. 2 is the same diagrammatic drawing of FIG. 1 but showing the locations of different points in the solids and gas streams to aid in understanding the material balance run reported in Table I of the specification.

The conditions maintained and results obtained in a material balance run are set forth in the following Table I wherein the conditions and compositions of the various gas and solids streams are tabulated. The gas streams are designated by numerals 1 to 8 inclusive, and the solids streams by letters A to H inclusive. The so designated streams are shown in FIG. 2 by the encircled numerals or letters, as the case may be. In addition, the pressures in pounds per square inch are shown by the encircled 3-digit numbers at several points throughout the system.

TABLE I
GAS STREAMS

| No. | 1 | 2 | 3 | 4 | 5 | 6 | 7 | 8 |
|---|---|---|---|---|---|---|---|---|
| Moles/hr | 2.93 | 1.47 | 1.62 | 5.72 | 6.99 | 6.99 | 7.02 | 8.78 |
| Pressure, p.s.i.a. | | | 522 | 522 | 550 | 521 | 533 | 530 |
| Temperature, °F | 842 | 842 | 1,971 | 1,866 | 1,165 | 1,656 | 1,700 | 1,347 |
| Composition, percent vol.: | | | | | | | | |
| $O_2$ | 20.99 | 20.99 | | | | | | |
| $N_2$ | 79.01 | 79.01 | | 60.62 | | | | 0.51 |
| CO | | | 35.62 | | | | 11.55 | 10.18 |
| $CO_2$ | | | 64.38 | 39.38 | | | 9.26 | 8.34 |
| $CH_4$ | | | | | | | 20.49 | 20.84 |
| $H_2$ | | | | | | 18.25 | 27.06 | 32.36 |
| $H_2O$ | | | | | 100.00 | 81.75 | 31.65 | 26.49 |
| $H_2S$ | | | | | | | | 1.26 |

SOLIDS STREAMS

| No. | A | B | C | D | E | F | G | H |
|---|---|---|---|---|---|---|---|---|
| Lb./hr | 100 | 666 | 732 | 753 | 1,562 | 2,236 | 1,569 | 17 |
| Temperature, °F | 350 | 1,795 | 1,700 | 1,656 | 1,948 | 1,795 | 1,770 | 1,866 |
| Composition, wt. percent: | | | | | | | | |
| C | 70.55 | | 3.96 | 3.85 | 45.31 | 31.99 | 45.57 | 11.40 |
| H | 3.93 | | | | | | | |
| N | 1.24 | | | | | | | |
| O | 5.69 | | | | | | | |
| S | 3.56 | | | | | | | |
| Ash | 15.03 | | 2.05 | 2.00 | 54.69 | 38.21 | 54.43 | 88.60 |
| Fe | | 11.03 | | | | 3.29 | | |
| $Fe_{.947}O$ | | 88.97 | 93.99 | 47.03 | | 26.51 | | |
| $Fe_3O_4$ | | | | 47.12 | | | | |

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. Apparatus for the production of hydrogen or methane comprising, in combination:
    (a) two interconnected vessels, the first vessel being adapted to confine a downwardly moving stream of iron oxide and carbonaceous solids under iron oxide reducing conditions, the second being adapted to confine a steam-iron reaction zone,
    (b) means for feeding carbonaceous solids,
    (c) a separation vessel interconnected to said first vessel and said second vessel for receiving the solids from said first vessel and adapted to confine a separation zone,
    (d) means for introducing a gas into the bottom of said separation vessel at a velocity sufficient to carry the carbonaceous solids out of the vessel, but not the iron oxides,
    (e) means for transferring iron oxides from the separation vessel to the second vessel,
    (f) means for introducing steam into the second vessel in oxidative relationship to reduced iron oxides received from said separation vessel,
    (g) means for removal of the gas product,
    (h) means for returning iron oxides discharged from the second vessel to the first vessel, and
    (i) means for returning carbonaceous solids from the separator through a combustion zone to said first vessel.

2. Apparatus for the production of hydrogen or methane comprising, in combination:
    (a) two interconnected vessel, one at a higher level than the other, the first and higher vessel being adapted to confine a downwardly moving bed of iron oxides and carbonaceous solids under iron oxide reducing conditions, the second and lower vessel being adapted to confine a steam-iron reaction zone,
    (b) means for feeding carbonaceous solids,
    (c) a separation vessel interconnected to said first vessel and said second vessel for receiving by gravity flow solids from said first vessel and adapted to confine a separation zone,
    (d) means for introducing a gas into the bottom of said separation vessel at a velocity sufficient to carry the carbonaceous solids out of the vessel, but not the iron oxides,
    (e) means for transferring iron oxides from the separation vessel to the second vessel,
    (f) means for introducing steam into the second vessel in oxidative relationship to reduced iron oxides received from said separation vessel,
    (g) means for removal of the gas product,
    (h) means for returning iron oxides discharged from the second vessel up to the top of the first vessel, and
    (i) means for returning carbonaceous solids from the separator through a combustion zone to the first vessel.

References Cited

UNITED STATES PATENTS

| 2,449,635 | 9/1948 | Barr | 23—214 |
| 2,602,809 | 7/1952 | Dickinson | 23—214 X |
| 2,640,034 | 5/1953 | Jones | 23—214 X |
| 3,017,250 | 1/1962 | Watkins | 23—214 |
| 3,076,702 | 2/1963 | Hemminger | 23—214 X |
| 3,222,147 | 12/1965 | Benson | 23—214 X |
| 3,503,724 | 3/1970 | Benson | 23—214 X |

JOSEPH SCOVRONEK, Primary Examiner

U.S. Cl. X.R.

23—284